(12) United States Patent
Lee

(10) Patent No.: US 8,064,000 B2
(45) Date of Patent: Nov. 22, 2011

(54) CELL TYPE PARALLAX-BARRIER AND STEREOSCOPIC IMAGE DISPLAY APPARATUS USING THE SAME

(75) Inventor: Young Hoon Lee, Seoul (KR)

(73) Assignee: Masterimage 3D Asia, LLC, Seoul (KR)

( * ) Notice: Subject to any disclaimer, the term of this patent is extended or adjusted under 35 U.S.C. 154(b) by 568 days.

(21) Appl. No.: 12/064,795

(22) PCT Filed: Aug. 25, 2006

(86) PCT No.: PCT/KR2006/003352
§ 371 (c)(1),
(2), (4) Date: Feb. 25, 2008

(87) PCT Pub. No.: WO2007/024118
PCT Pub. Date: Mar. 1, 2007

(65) Prior Publication Data
US 2008/0231767 A1    Sep. 25, 2008

(30) Foreign Application Priority Data
Aug. 26, 2005    (KR) ................. 10-2005-0078650

(51) Int. Cl.
  *G02F 1/1335*    (2006.01)
  *G02F 1/1347*    (2006.01)
(52) U.S. Cl. .............. 349/15; 349/74; 349/77
(58) Field of Classification Search ............ 349/15, 349/74, 77
See application file for complete search history.

(56) References Cited

U.S. PATENT DOCUMENTS

| | | |
|---|---|---|
| 5,561,537 A | 10/1996 | Aritake et al. |
| 5,969,850 A | 10/1999 | Harol et al. |

(Continued)

FOREIGN PATENT DOCUMENTS

CN    1655011 A    8/2005

(Continued)

OTHER PUBLICATIONS

Office Action dated Jun. 2, 2010 as received in related Japanese Application No. 2008-527852.

(Continued)

*Primary Examiner* — Michael Caley
(74) *Attorney, Agent, or Firm* — Maschoff Gilmore & Israelsen

(57) ABSTRACT

The present invention discloses a parallax-barrier comprising a Liquid-Crystal layer (LC layer) including pixels arranged in cell type matrix structure to form a barrier of horizontal or vertical direction according to a predetermined control method, a controller for controlling said pixels of said LC layer in order to form a barrier pattern of horizontal or vertical direction pattern, by turning said pixels on or off selectively according to said control method, a lower layer formed between said LC layer and a predetermined display module in order to dispose said LC layer and said controller at a position off from said display module by a predetermined distance, an upper layer formed on the top of said LC layer in order to dispose said LC layer and said controller, and a polarizer formed on the top of said upper layer, and visualizing said barrier according to said barrier pattern which is formed on said LC layer by controlling polarization angle of the light, wherein said light being emitted from said display module and passing through said lower layer, said LC layer and said upper layer. Thus, stereoscopic images that are rotated in the horizontal/vertical direction can be displayed using said parallax-barrier and said stereoscopic image display apparatus comprising said parallax-barrier.

11 Claims, 10 Drawing Sheets

U.S. PATENT DOCUMENTS

| | | | |
|---|---|---|---|
| 6,137,456 A * | 10/2000 | Bhagavatula et al. | 345/7 |
| 6,246,451 B1 * | 6/2001 | Matsumura et al. | 349/15 |
| 2005/0151954 A1 | 7/2005 | Bartray | |
| 2006/0082519 A1 * | 4/2006 | Nam et al. | 345/9 |

FOREIGN PATENT DOCUMENTS

| | | | |
|---|---|---|---|
| JP | 03-119889 A | 5/1991 |
| JP | 05-122733 A | 5/1993 |
| JP | 07-236164 A | 9/1995 |
| JP | 09-073049 A | 3/1997 |
| JP | 09-159970 A | 6/1997 |
| JP | 2005-134689 A | 5/2005 |
| JP | 2006-154809 A | 6/2006 |
| JP | 2006-337866 A | 12/2006 |
| KR | 2005-0049626 A | 5/2005 |
| WO | 20041040354 A | 5/2004 |

OTHER PUBLICATIONS

Office Action dated Sep. 29, 2010 as received in related Japanese Application No. 2008-527852.

Notice of Allowance dated Jan. 26, 2011 as received in related Japanese Application No. 2008-527852.

* cited by examiner

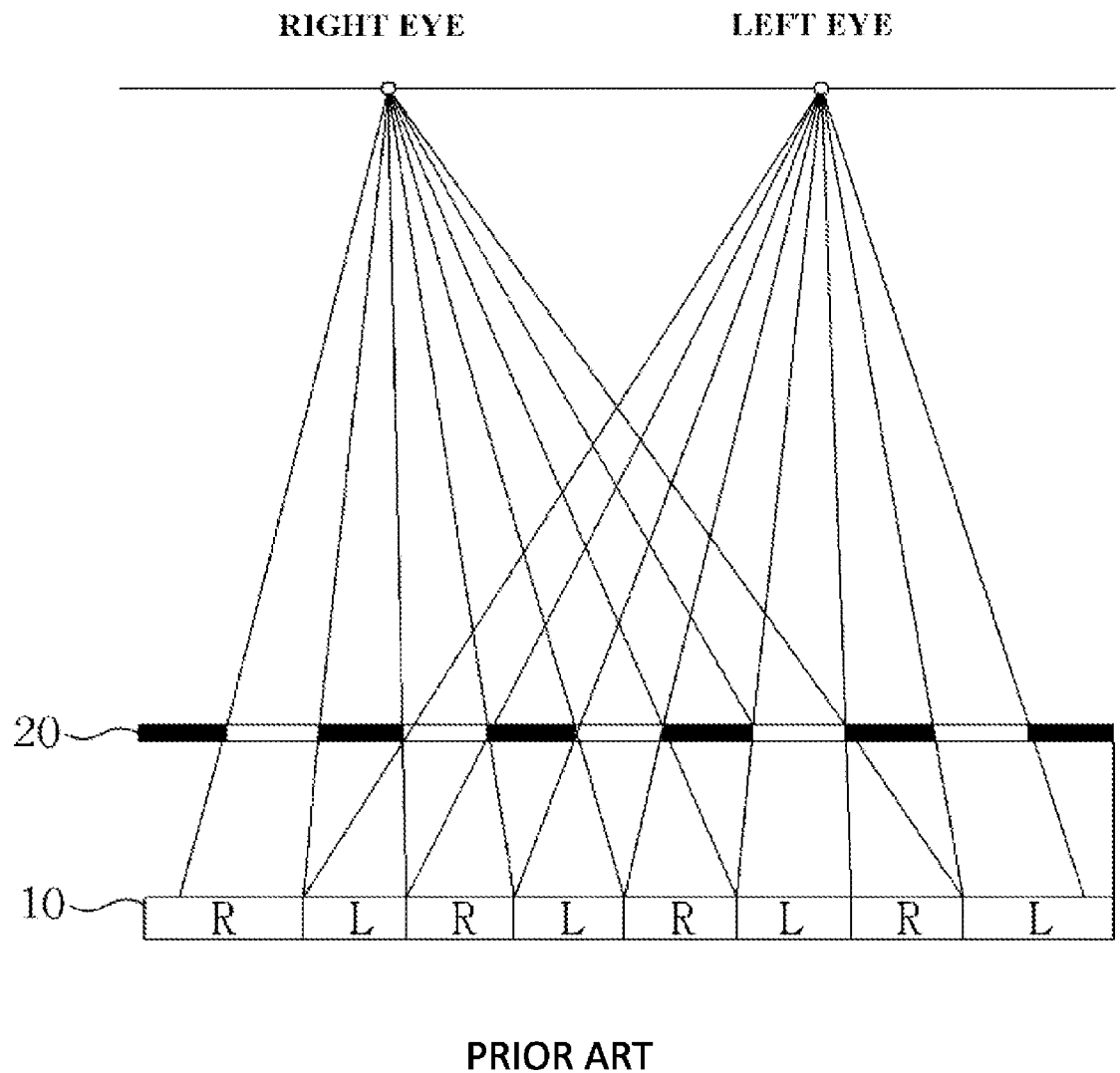
PRIOR ART

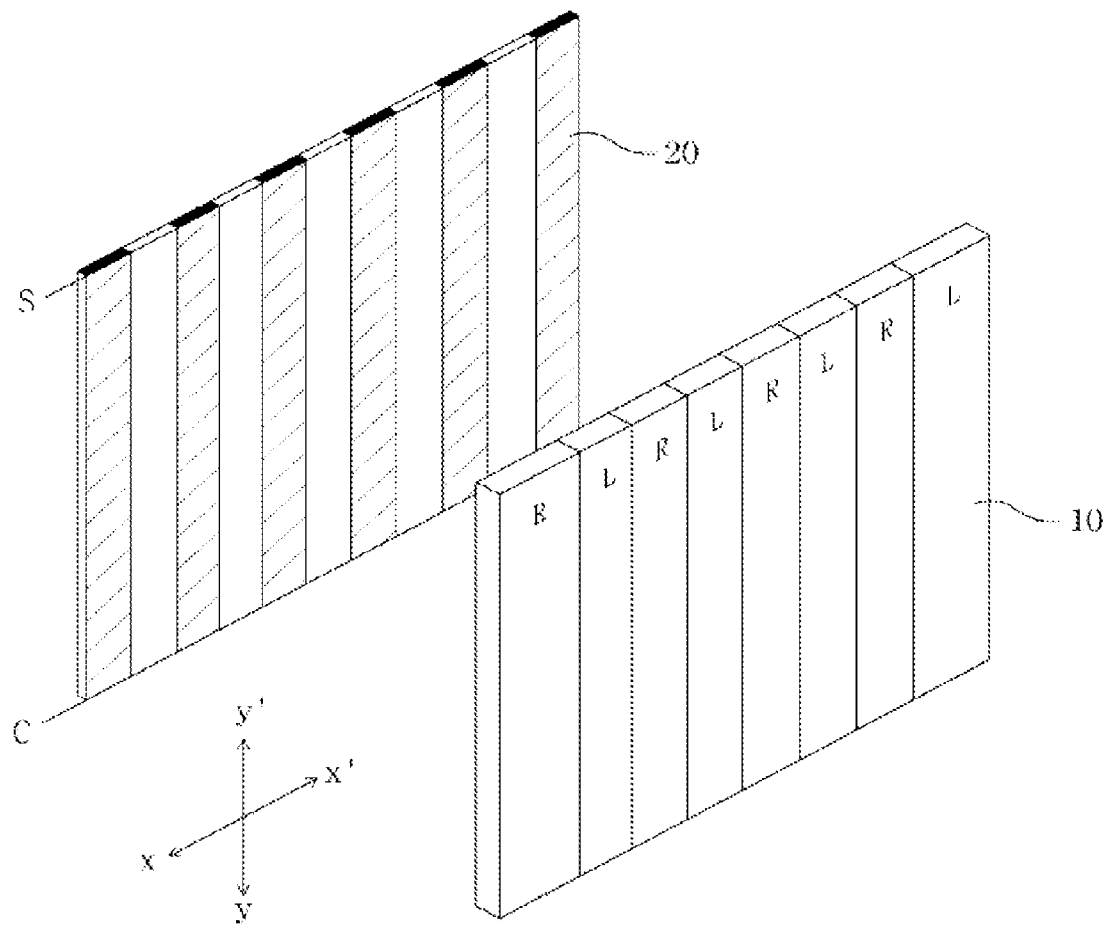
PRIOR ART

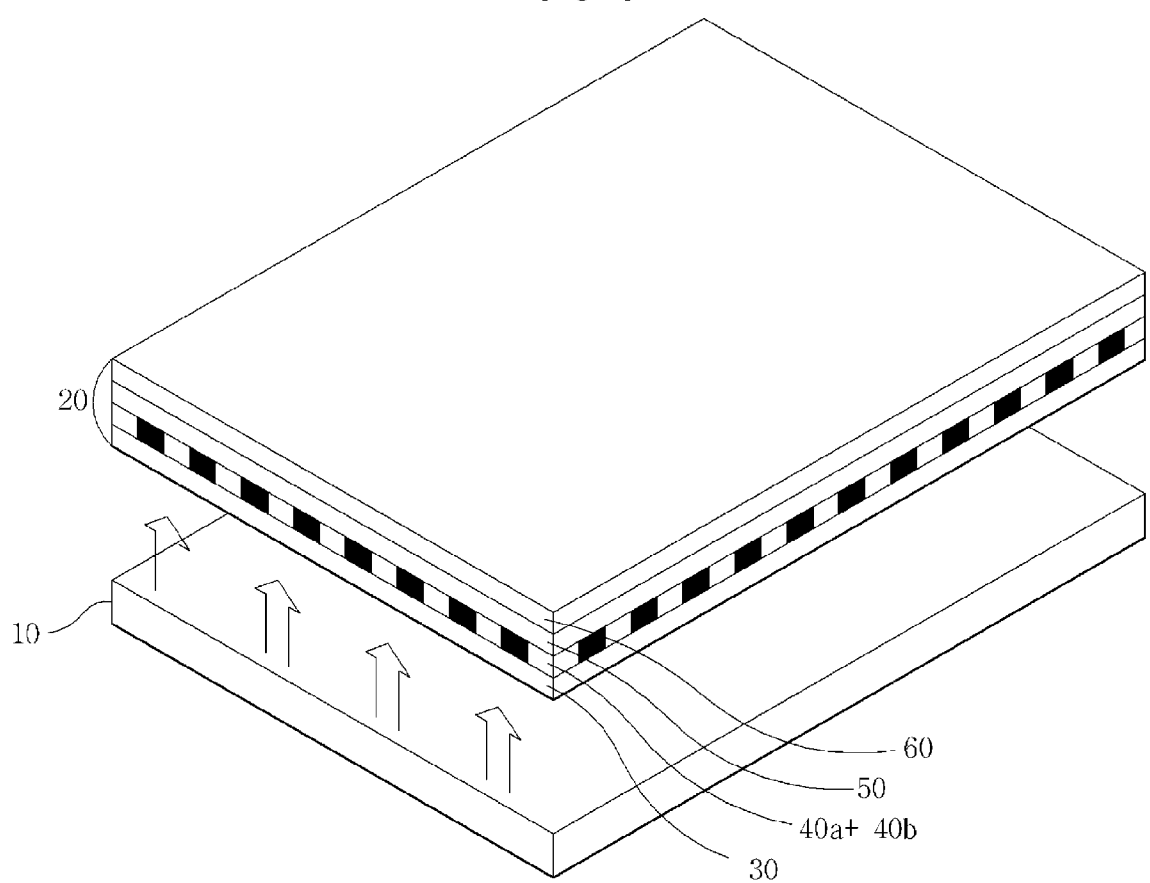

[Fig. 4]
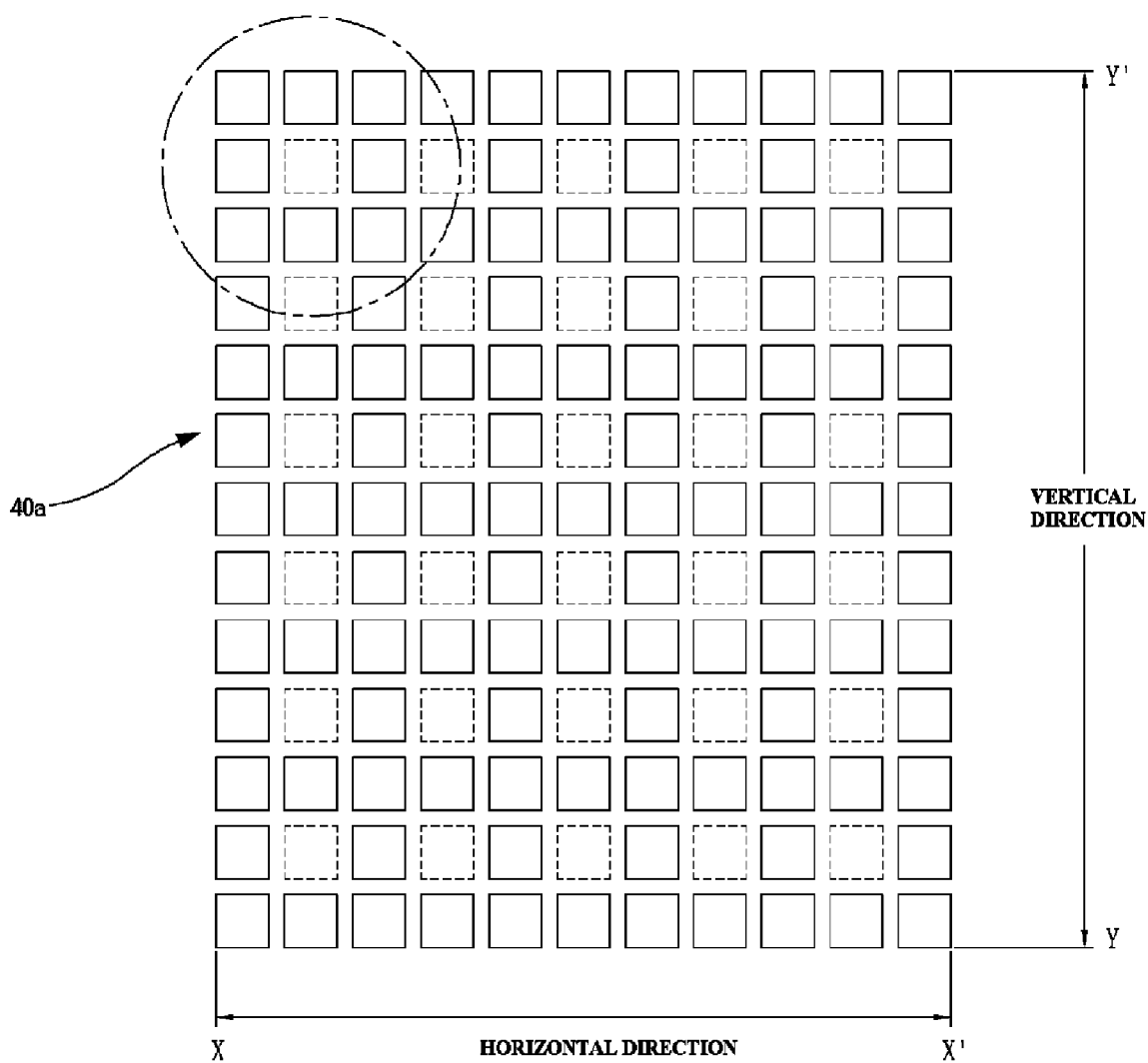
[Fig. 5]
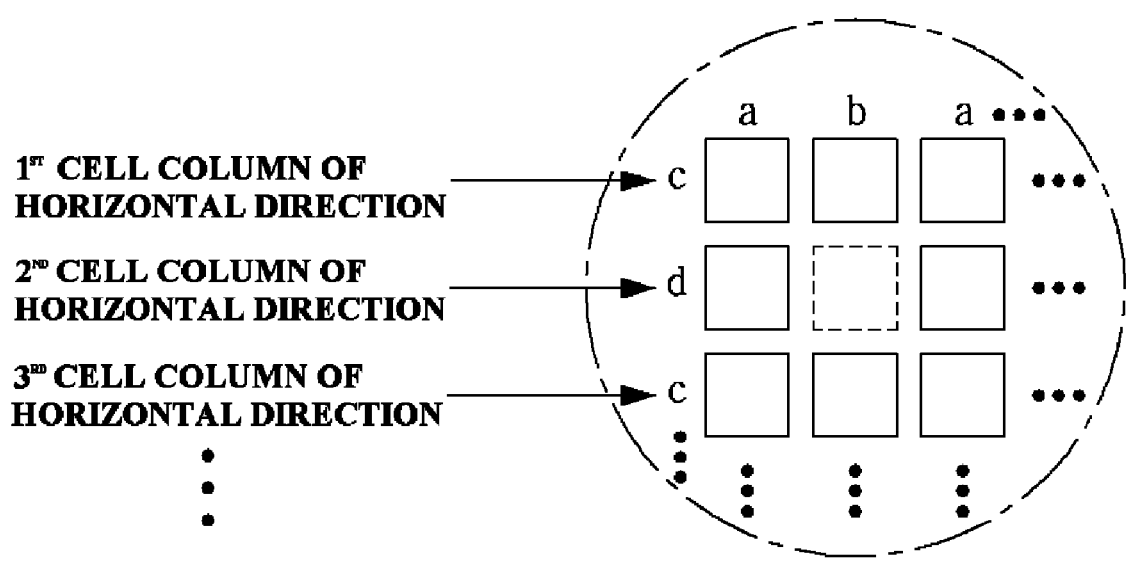
1ST CELL COLUMN OF HORIZONTAL DIRECTION
2ND CELL COLUMN OF HORIZONTAL DIRECTION
3RD CELL COLUMN OF HORIZONTAL DIRECTION

[Fig. 6]
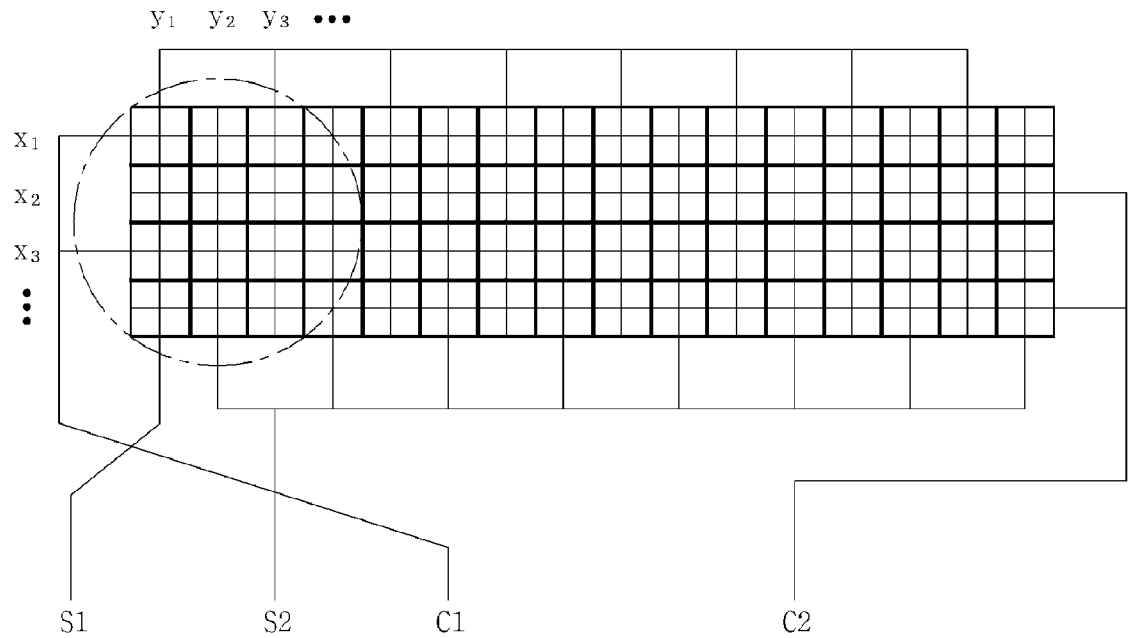
[Fig. 7]
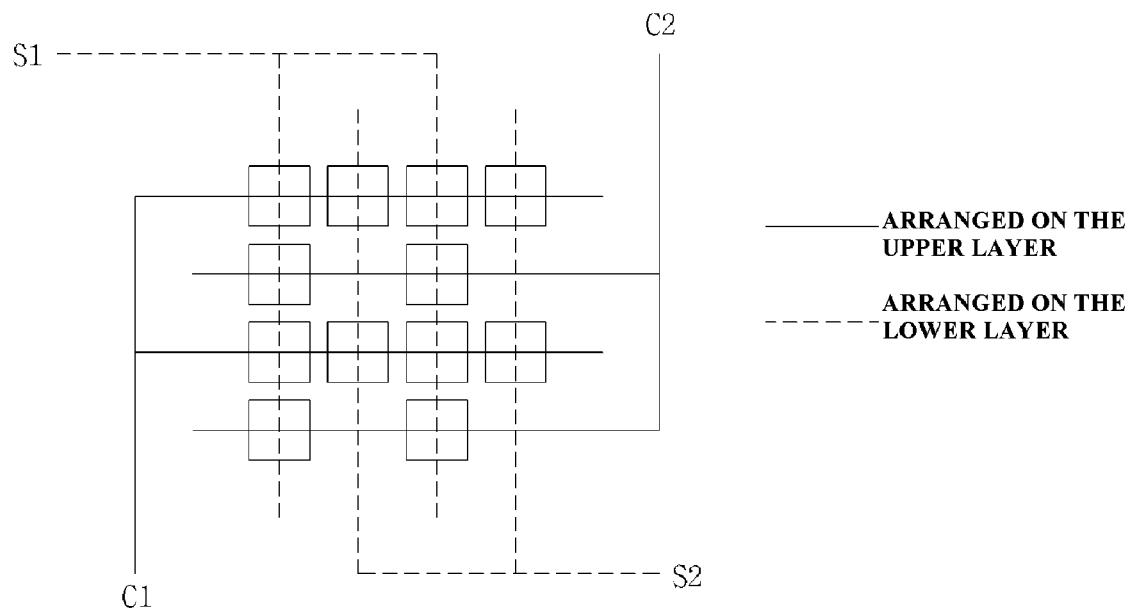

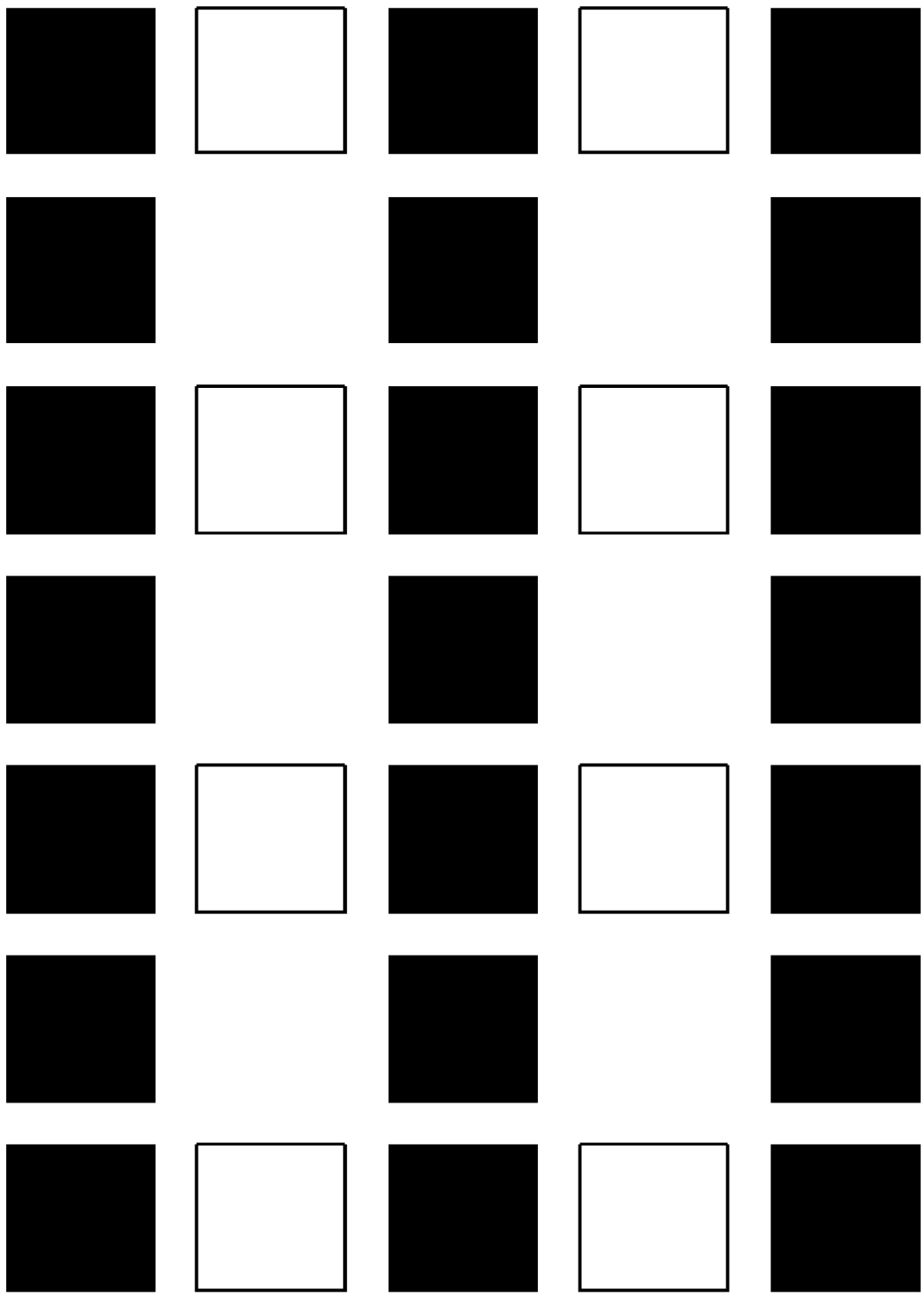
[Fig. 8]

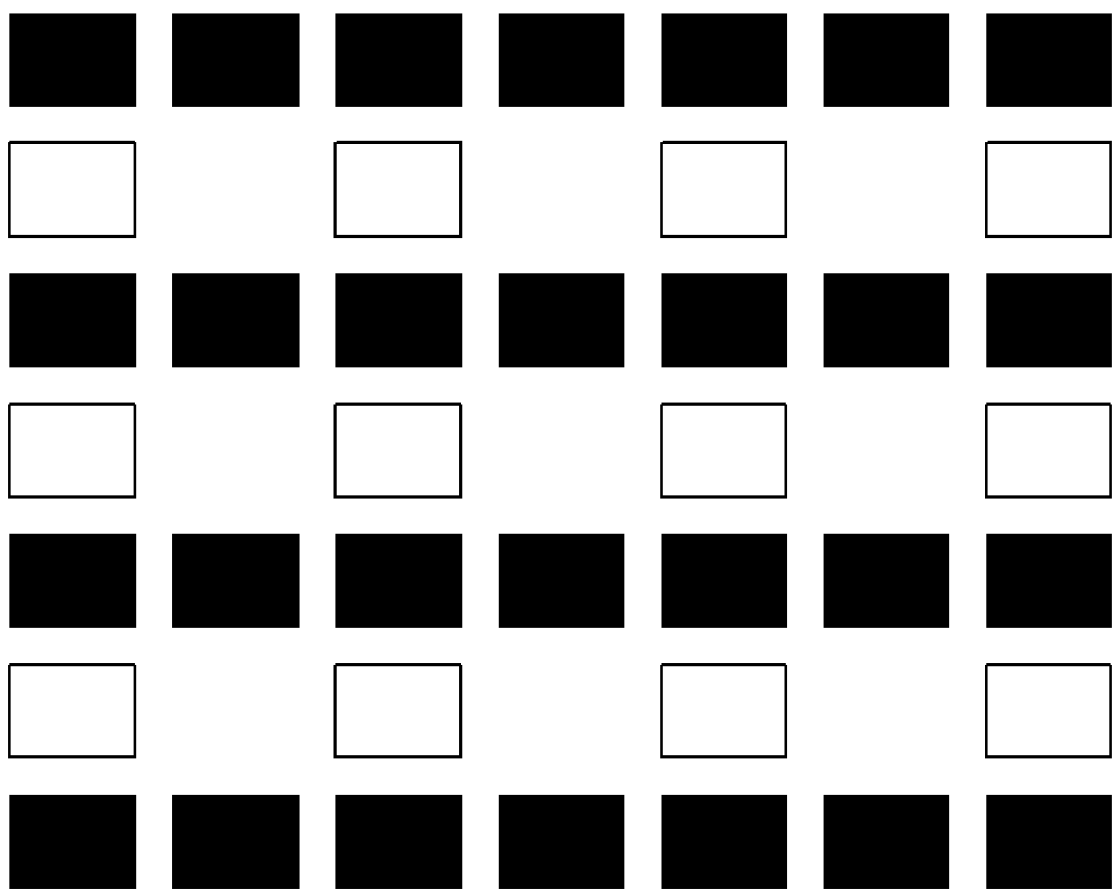
[Fig. 9]

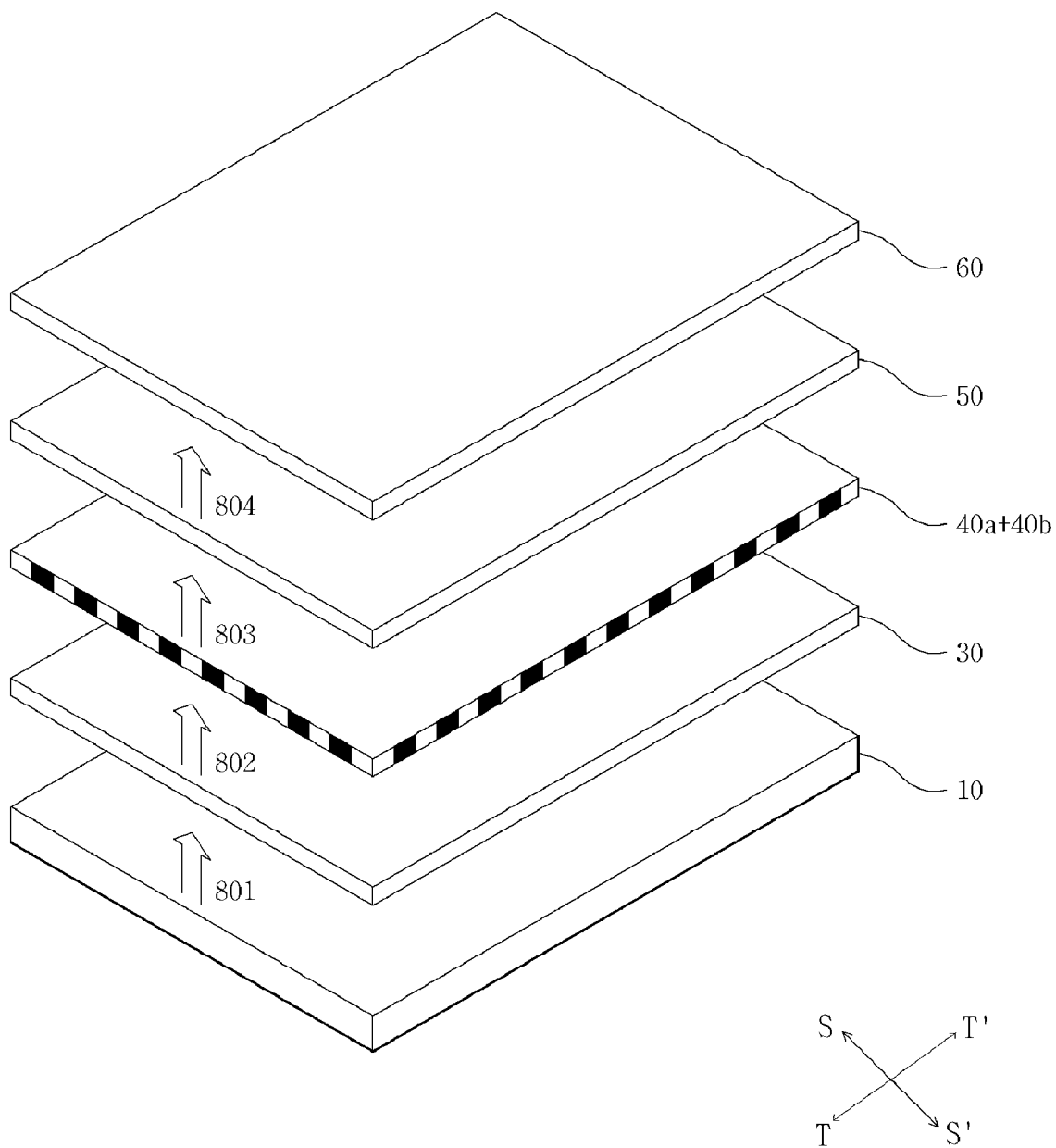
[Fig. 10]

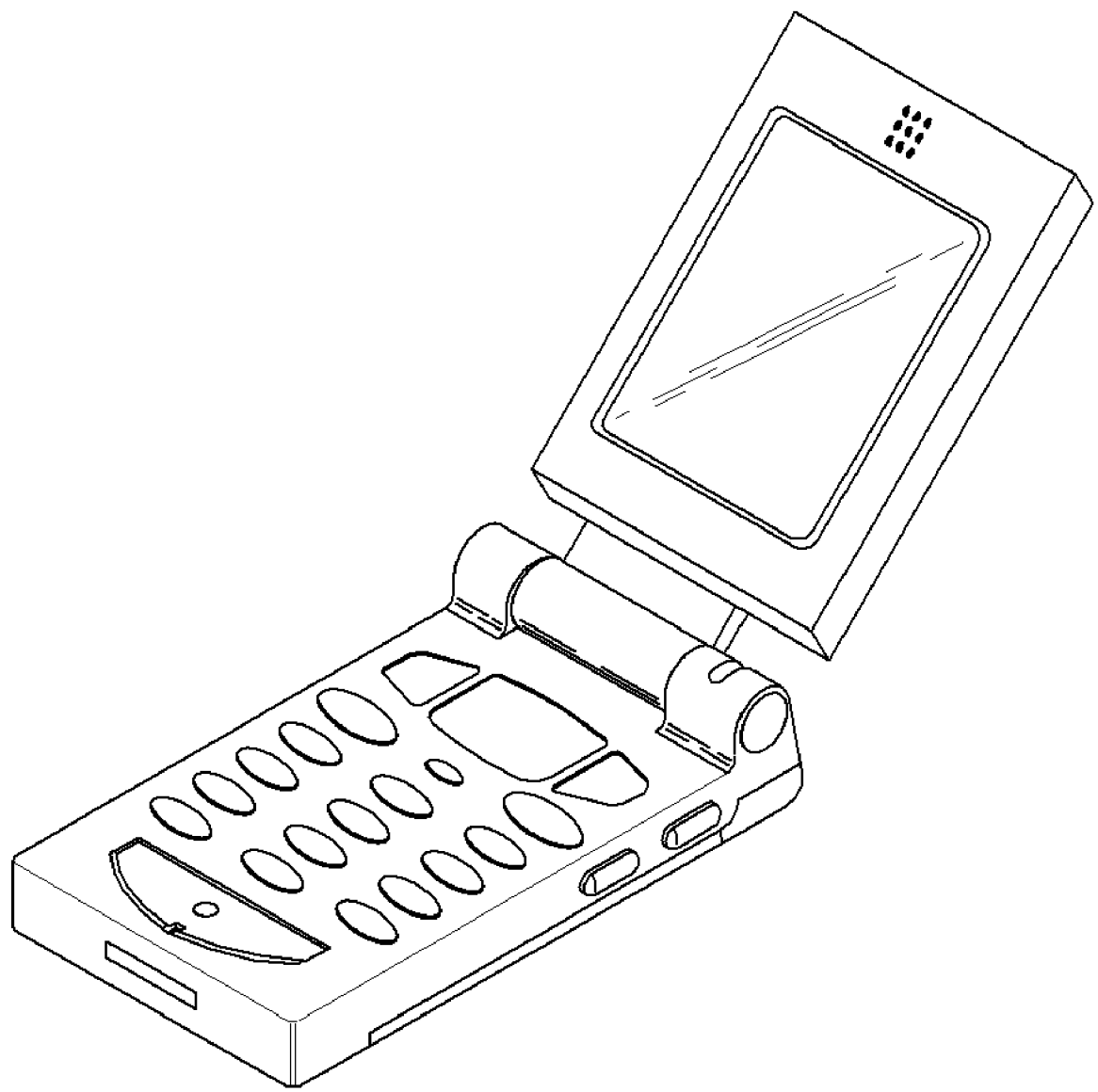
[Fig. 11]

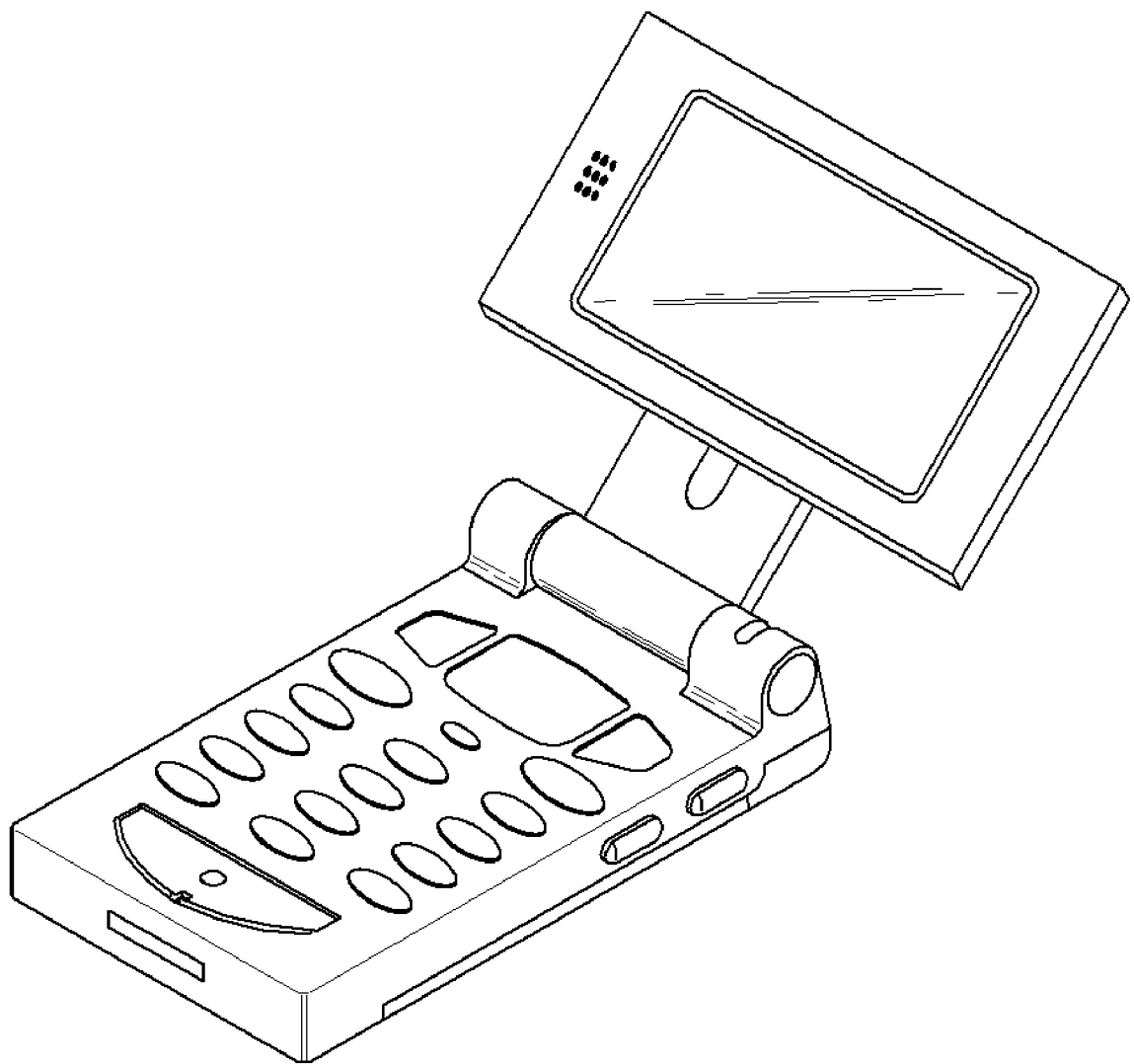
[Fig. 12]

CELL TYPE PARALLAX-BARRIER AND STEREOSCOPIC IMAGE DISPLAY APPARATUS USING THE SAME

TECHNICAL FIELD

The present invention relates to a stereoscopic image display apparatus, more specifically, a parallax-barrier comprising a liquid-crystal layer (LC layer) formed in a cell type matrix structure; and a stereoscopic image display apparatus comprising said parallax-barrier.

BACKGROUND ART

Information communication technology has been improved to the extent that it is possible for digital terminals to process text messages, voices and images with very high speed to service multimedia contents with two-dimensional images and voices. Information communication technology is further expected to be developed to a three-dimensional stereoscopic information communication service which is capable of providing multimedia services with stereoscopic and real impact.

Generally, stereoscopic images with three dimensional effects are possible based on the theory of stereo-eyesight by both eyes. An important factor for a three dimensional effect is the difference in optical angles of a person's two eyes, due to a distance of 65 mm therebetween, i.e., a parallax of the eyes. That is, each of the eyes respectively sees two different two-dimensional images, and when said two images are transferred via retina to the brain, the brain combines said transferred two images and reproduces the original three-dimensional image with sense of depth and sense of reality. This is generally referred to stereography.

A stereoscopic image display apparatus is classified into two generic types based on whether a user should wear a specific pair of glasses or not: a glasses-type of stereoscopic image display apparatus (stereoscopic image display apparatus) and a non-glasses-type of stereoscopic image display apparatus (auto-stereoscopic image display apparatus).

The stereoscopic image display apparatus gives a watcher inconvenience of wearing special glasses, while the auto-stereoscopic image display apparatus allows a watcher to enjoy three-dimensional images only by directly watching the screen even without wearing said glasses, and thereby the auto-stereoscopic image display apparatus solves problems with the stereoscopic image display apparatus. Therefore, there are many studies on the auto-stereoscopic image display apparatus going on nowadays. The auto-stereoscopic image display apparatus again can be classified into two generic types: apparatus by the lenticular method and apparatus by the parallax-barrier method.

As shown in FIG. 1 and FIG. 2, operation of the stereoscopic image display apparatus by the conventional parallax-barrier method are explained as follows. The stereoscopic image display apparatus by the conventional parallax-barrier method comprises a display module (10), wherein the left image (L) and the right image (R) respectively corresponding to the left eye and the right eye face towards the vertical direction (Y-Y' direction in FIG. 2) and are disposed alternately in the horizontal direction (X-X' direction in FIG. 2); and a blocking film in the form of a bar which is called a barrier (20), disposed at the front end and facing towards the vertical direction. This kind of stereoscopic image display apparatus has a system wherein said display module (10) and barrier (20) are disposed so as that the light for the left image (L) goes only into the left eye, and the light for the right image (R) goes only into the right eye, and thereby the divided two left and right images (L, R) are separately observed to give the stereoscopic sense.

DISCLOSURE OF INVENTION

Technical Problem

The stereoscopic image display apparatus of the conventional parallax-barrier method is based on the TFT-LCD display method, but since the RGB display method of said TFT-LCD equally divides one pixel into three in the horizontal direction (X-X' direction in FIG. 2) as R, G and B, it sometimes happens that a part of R, G or B is blocked by the disposition or the thickness of the barrier (20), and thus cannot be seen, which results in failing to display a stereoscopic image properly. Further, as another problem, the thickness of and the distance between barriers are limited, and thus the visibility angle gets narrowed and the watching distance gets restricted to a specific length.

Moreover, in the conventional parallax-barrier method using a liquid crystal module, barriers are formed in the form of a vertical bar arranged in a line in the horizontal direction, and a segment terminal (S) and a common terminal (C) are connected to the entire pixels, so that the entire pixels are controlled to turn on/off at the same time, and thus the arrangement direction of the barrier is fixed, and thus it is possible for watchers to watch stereoscopic images only on a screen displaying images in the fixed direction, and it is impossible to watch stereoscopic images by turning the screen in the horizontal/vertical direction.

Further, in the conventional method, the barrier is formed in the form of a vertical bar without a gap, and thus conventional method is problematic in that the light emitted from the display screen is blocked, and the original luminance of the display is reduced to a quite low level.

Technical Solution

In order to solve problems as above, the present invention has been designed to provide a parallax-barrier in a cell type wherein the barrier can be vertically or horizontally converted, and thus the reduction of the luminance of the light by the barrier is minimized.

Another object of the present invention is to provide a stereoscopic image display apparatus comprising a flat display module including TFT-LCD, organic EL (OLED), FED, PDP, etc., and a parallax-barrier in said cell type.

Advantageous Effects

The parallax-barrier of the present invention and a stereoscopic image display apparatus comprising said parallax-barrier are capable of converting between 2D and 3D modes as well as converting a barrier into the horizontal or the vertical direction according to features of stereoscopic images by making said barrier as a cell type utilizing a liquid crystal panel in order to reproduce stereoscopic images.

Moreover, the parallax-barrier and a stereoscopic image display apparatus comprising said parallax-barrier can enhance the luminance by allowing a cell gap between pixels arranged in a cell type at the LC layer, and controlling the etching directions of the lower layer and the upper layer and the direction of the polarized light.

Further, the parallax-barrier of the present invention and a stereoscopic image display apparatus comprising said parallax-barrier are able to display stereoscopic images by rotating pixels in R, G and B arranged in the horizontal direction by 90°, and thereby the visibility angle and watching distance can be improved.

Moreover, the parallax-barrier of the present invention and a stereoscopic image display apparatus comprising said parallax-barrier have little difficulty in manufacturing, and thus the working efficiency can be enhanced.

Finally, the parallax-barrier and a stereoscopic image display apparatus comprising said parallax-barrier control pixels by a vertical/horizontal column unit, not by a cell unit when forming a barrier, and thus the structure of the apparatus is simplified and the cost for manufacture can be reduced.

BRIEF DESCRIPTION OF THE DRAWINGS

FIG. 1 is a cross sectional view of a stereoscopic image display apparatus using the conventional parallax-barrier.

FIG. 2 is a perspective view of a stereoscopic image display apparatus using the conventional parallax-barrier.

FIG. 3 is a structure diagram of a parallax-barrier according to the present invention and a stereoscopic image display apparatus comprising said parallax-barrier.

FIG. 4 and FIG. 5 are illustrative diagrams of the cell structure of the LC layer according to the present invention.

FIG. 6 is a structure diagram showing the control line connection to drive pixels of the LC layer according to the present invention.

FIG. 7 is an enlarged diagram of a part of FIG. 6.

FIG. 8 and FIG. 9 are illustrative diagrams showing a barrier shape by the control of pixels of the LC layer according to the present invention.

FIG. 10 is an illustrative diagram showing the function of the luminance enhancement of the stereoscopic image display apparatus according to the present invention.

FIG. 11 and FIG. 12 are illustrative diagrams showing a liquid-crystal display of a cellular phone, using a stereoscopic image display apparatus comprising a parallax-barrier according to the present invention.

DESCRIPTION OF REFERENCE NUMBERS IN THE DRAWINGS

10: display module
20: parallax-barrier
30: lower layer
40a: LC layer
40b: controller
50: upper layer
60: polarizer
801, 802, 803, 804: lights

BEST MODE FOR CARRYING OUT THE INVENTION

Hereinafter, the constitutions mentioned above are explained in detail in reference to drawings. Drawings and detailed description of the specific constitutions to be explained hereafter are to help a skilled person in the art easily understand and carry out the present invention, and note that they should not be interpreted as restricting the scope of the present invention. The same reference number throughout the drawings indicates the same constituent.

FIG. 3 briefly shows a parallax-barrier according to the present invention, and constituents of a stereoscopic image display apparatus comprising said parallax-barrier. The parallax-barrier (20) according to the present invention comprises a lower layer (30), a LC layer (40a), a controller (40b), an upper layer (50) and a polarizer (60). Said LC layer (40a) includes pixels arranged in cell type matrix structure to form a barrier of horizontal or vertical direction according to a predetermined control method, and said controller (40b) controls said pixels of said LC layer in order to form a barrier pattern of horizontal or vertical direction pattern, by turning said pixels on or off selectively according to said control method, and the cell type of the pixels included in the LC layer (40a) and specific controlling method will be explained hereafter in detail. Said lower layer (30) is formed between said LC layer and a predetermined display module in order to dispose said LC layer and said controller at a position off from said display module by a predetermined distance. Said upper layer (50) is formed on the top of said LC layer in order to dispose said LC layer and said controller. Moreover, said polarizer (60) is formed on the top of said upper layer, and visualizes said barrier according to said barrier pattern which is formed on said LC layer by controlling polarization angle of the light, wherein said light being emitted from said display module and passing through said lower layer, said LC layer and said upper layer. Unlike a conventional parallax-barrier wherein a polarizer is placed at the upper end of the upper layer and the lower end of the lower layer, the parallax-barrier of the present invention has a polarizer (60) only at the upper end of the upper layer (50), and thereby the reduction of the luminance of light due to passing through the polarizer (60) can be minimized.

Further, the parallax-barrier (20) of the present invention and the stereoscopic image display apparatus comprising said parallax-barrier forms a barrier pattern using liquid crystal panel such as TN-LCD or STN-LCD, etc. so that a user can watch 2D images by turning the barrier off at 2D mode, and 3D images by turning the barrier on at 3D mode. Further, the user can watch the picture displaying vertical-direction stereoscopic images by turning on the vertical-direction barrier through driving the vertical-direction pixels, and horizontal-direction stereoscopic images by turning on the horizontal-direction barrier through driving the horizontal-direction pixels. That is, the barrier according to the present invention and the stereoscopic image display apparatus comprising said barrier are capable to convert between 2D and 3D modes and between vertical and horizontal displays.

FIG. 4 and FIG. 5 are illustrative diagrams showing a barrier pattern structure in a cell type of the LC layer (40a) of the present invention. The LC layer (40a) forms a pattern structure in a cell type by arranging cell type barriers of each different size by turns according to the horizontal direction (X-X') and the vertical direction (Y-Y'). As shown in FIG. 5, when pixels forming each horizontal-direction barrier are called a first horizontal-direction cell column, a second horizontal-direction cell column, a third horizontal-direction cell column, etc., a first pixel whose width*length is a*c and a second pixel with b*c are placed at the first horizontal-direction cell column by turns (i.e. in alternately repeated manner), and a third pixel whose width*length is a*d and a fourth pixel with b*d are placed at the second horizontal-direction cell column by turns. Here, the values of a, b, c and d are computed based on the display module standard, and they are determined so as to accurately indicate the thickness and interval of barriers.

Moreover, the third horizontal-direction cell column is arranged so as to have the same structure as the first horizontal-direction cell column, and the fourth horizontal-direction cell column is arranged so as to have the same structure as the second horizontal-direction cell column. That is, the barrier substrate of the present invention has an arrangement wherein two horizontal-direction cell columns having different structures are arranged in the vertical-direction by turns.

As shown in an example of the present invention, in order to form a horizontal-direction barrier, a barrier can be formed by turning all odd-numbered cell columns on and allowing an interval between barriers by turning all even-numbered cell columns off; or by turning all odd-numbered cell columns off to allow an interval between barriers and turning all even-numbered cell columns on.

Further, a skilled person in the art can clearly understand from observing said structure from a vertical direction that the first pixel whose width*length is a*c and the third pixel with a*d are arranged at the first vertical-direction cell column by turns, and the second pixel whose width*length is b*c and the fourth pixel with b*d are arranged at the second vertical-direction cell column by turns.

Thus, the parallax-barrier pattern according to the present invention comprises a constitution of a cell column in which two pixels in different sizes are arranged in the horizontal and the vertical directions, and also two cell columns having different structures according to said arrangement are arranged in the horizontal and the vertical directions by turns.

As explained above, the barrier pattern has a structure wherein cell columns having different sizes are arranged in the horizontal and the vertical directions by turns. However, as shown in FIG. 4 and FIG. 5, an example of the present invention has a constitution wherein, after a barrier forming columns and an interval forming columns are determined, the fourth pixel, whose with*length is b*d and which always forms an interval when forming a barrier of vertical-direction or horizontal-direction, remains off all the time so that when forming an LC pattern structure, it can be removed by turns in the vertical or horizontal direction to constitute a barrier pattern.

In said structure, a minute cell gap is formed between each pixels. Said cell gap has a size of from smaller than ten micrometers to several tens micrometers, preferably about 10 micrometers, but is not limited thereto. As shown in FIG. 4 and FIG. 5, the barrier pattern structure of the present invention is formed not by a vertical bar without gap as in prior art, but by a combination of pixels having cell gaps disposed at a certain interval distance. Thus, the barrier pattern of the present invention looks like a vertical bar without a gap due to the small size of the cell gap, and thereby it is capable of convert the barrier into vertical or horizontal directions while maintaining functions of the conventional barrier.

Moreover, the controller (40b) of the parallax-barrier of the present invention and the stereoscopic image display apparatus comprising said parallax-barrier controls the LC layer (40a), including two segment terminals (S1, S2) and two common terminals (C1, C2), and specific details thereof are explained by referring to FIG. 6 and FIG. 7.

That is, the conversion of the barrier between 2D mode and 3D mode and between vertical direction and horizontal direction is made by turning pixels on or off based on combinations of two segment terminals (S1, S2) and two common terminals (C1, C2) connected to the LC layer (40a). For instance, suppose cell columns in the horizontal direction of the LC layer be x1, x2, x3, etc. and cell columns in the vertical direction y1, y2, y3, etc., as shown in FIG. 6, the segment terminal (S1) is connected to odd-numbered columns such as y1, y3, y5, etc. of the cell columns in the vertical direction, and the segment terminal (S2) is connected to even-numbered columns such as y2, y4, y6, etc. of the cell columns in the vertical direction; and the common terminal (C1) is connected to odd-numbered columns such as x1, x3, x5, etc. of the cell columns in the horizontal direction, and the common terminal (C2) is connected to even-numbered columns such as x2, x4, x6, etc. of the cell columns in the horizontal direction. FIG. 7 shows an enlarged diagram of the marked portion of FIG. 6. Afterwards, when segment terminal (S1), common terminal (C1) and common terminal (C2) are activated, a vertical-direction barrier is formed as shown in FIG. 8. Moreover, when segment terminal (S1), segment terminal (S2) and common terminal (C1) are activated, a horizontal-direction barrier is formed as shown in FIG. 9, and thereby it becomes possible to display stereoscopic images on the screen rotated by 90°. However, the parallax-barrier of the present invention and the stereoscopic image display apparatus comprising said parallax-barrier are not limited to said example wherein the segment terminals (S1, S2) are connected to the vertical-direction cell columns and the common terminals (C1, C2) to the horizontal-direction cell columns, and it is also clear to a skilled person in the art that an example is possible wherein segment terminals (S1, S2) are connected to the horizontal-direction columns and common terminals (C1, C2) to the vertical-direction columns and thereby switch the connection of horizontal/vertical directions. That is, the parallax-barrier of the present invention and the stereoscopic image display apparatus comprising said parallax-barrier control pixels by a cell unit in order to activate pixels, and in return, they are capable of displaying stereoscopic images in a simple way by controlling in driving pixels by a column unit.

The thickness and an interval of barriers are determined based on the thickness of flat panel display, watching distance and dot pitch of a cell. Meanwhile, as aforementioned, it can be problematic that since a conventional TFT-LCD equally divides a pixel in three as R, G and B in the horizontal direction, stereoscopic images may not be properly displayed on a vertical-direction screen because R, G or B can be partly blocked, and visibility angle and watching distance may be narrowed. However, the parallax-barrier of the present invention and the stereoscopic image display apparatus comprising said parallax-barrier can convert the direction of the barrier in horizontal/vertical direction, and thus they can rotate the TFT-LCD screen by 90° in the horizontal direction. In this case, since the arrangement direction of RGB is shifted to the vertical direction, not to the horizontal direction, each R, G and B can be uniformly displayed without being blocked regardless of the position and thickness of barriers, and accordingly, designing the thickness of and an interval of barriers become easy and thus the luminance, visibility angle and watching distance can be remarkably enhanced. That is, it is possible to design a barrier to have a narrow thickness and a wide interval to the next barrier, and thereby it is possible to achieve a wider visibility angle, more enlarged watching distance and better luminance over the conventional RGB display method; and further, difficulty in manufacture process is lowered, and thus the work efficiency is enhanced.

Hereafter, the enhanced function of the luminance of the parallax-barrier of the present invention and the stereoscopic image display apparatus comprising said parallax-barrier will be explained by referring to FIG. 10. The light (801) emitted from the display module such as TFT-LCD has a single direction of a polarized light (e.g., S-S' direction). Thus, if the etching direction of the lower layer (30) is made coincident with the polarized direction (S-S') of the light (801), the reduction of luminance of the light can be minimized. After that, the light (802) which has passed through the lower layer (30) goes into the LC layer (40a). In an example, said LC layer (40a) may be made of a twisted magnetic (TN) liquid crystal (LC) having 90° twist angle, and said TN LC molecules maintain the 90° twist angle when no voltage is applied, and when a specific electric field is applied, the twist angle becomes loose. Thus, by forming the etching direction of the upper layer (50) by 90° difference from the etching direction of the lower layer (30), it is possible to form or remove a barrier pattern according as whether the LC layer (40a) is driven or not. Then, the light (804) enters the polarizer (60), and then the polarizer (60) is made to have the same polarized direction as the etching direction of the upper layer (50), and thereby the reduction of the luminance of the light (804) is minimized.

Moreover, as mentioned above, the parallax-barrier of the present invention and the stereoscopic image display apparatus comprising said parallax-barrier have a cell gap between pixels formed at the LC layer (40a), and thereby the reduction of the luminance of the light is minimized.

As shown above, the structure of the present invention, wherein a pixel is vertically divided in R, G and B which are displayed by means of the vertical-direction or horizontal direction conversion function, can be immediately embodied in a flat panel display, such as the conventional TFT-LCD, organic EL, PDP, FED, etc., wherein a pixel is divided in three as R, G and B in the horizontal direction in order to display images, if the screen rotated by 90°. Thus, by designing the barrier to be able to convert to horizontal and vertical direction, not to a single direction, stereoscopic images may be displayed on a screen displaying images after dividing pixels into R, G, and B not only in the horizontal direction, but also in the vertical direction as well.

FIG. 11 and FIG. 12 are examples showing a stereoscopic image display apparatus comprising a parallax-barrier of the present invention being applied to the liquid crystal display of a cellular phone. Recently, cellular phones such as those with functions of motion pictures or games often comprise a constitution that makes it possible to rotate an LCD device in the horizontal direction. Thus, using the stereoscopic image display apparatus of the present invention, it is possible to allow cellular phones to display stereoscopic images with high quality both in the horizontal direction and the vertical direction. Moreover, liquid crystal display for a cellular phone is typically TFT-LCD, and as aforementioned, the liquid crystal display can be rotated by 90° so as to divide a pixel into R, G and B in the vertical direction, and thereby an effect is obtained that none of said R, G or B is blocked by the barrier. Moreover, as already mentioned, the LCD device of the present invention may be applied to displays such as organic EL, PDP, FED, etc., and a skilled person in the art can understand that the scope of the present invention is not limited to said examples.

Moreover, already mentioned examples are just to help a skilled person in the art sufficiently understand and carry out the present invention. A skilled person in the art is aware that said examples can be modified in various ways, and the general theory defined herein may be applied to other examples without going beyond the technical gist or scope of the present invention. Thus, the present invention does not intend to limit its scope to the examples disclosed herein, but intends to include the largest scope covering the theory and novel feature disclosed herein.

INDUSTRIAL APPLICABILITY

The parallax-barrier of the present invention and a stereoscopic image display apparatus comprising said parallax-barrier are capable of converting between 2D and 3D modes as well as converting a barrier into the horizontal or the vertical direction according to features of stereoscopic images by making said barrier as a cell type utilizing a liquid crystal panel in order to reproduce stereoscopic images.

Moreover, the parallax-barrier and a stereoscopic image display apparatus comprising said parallax-barrier can enhance the luminance by allowing a cell gap between pixels arranged in a cell type at the LC layer, and controlling the etching directions of the lower layer and the upper layer and the direction of the polarized light.

Further, the parallax-barrier of the present invention and a stereoscopic image display apparatus comprising said parallax-barrier are able to display stereoscopic images by rotating pixels in R, G and B arranged in the horizontal direction by 90°, and thereby the visibility angle and watching distance can be improved.

Moreover, the parallax-barrier of the present invention and a stereoscopic image display apparatus comprising said parallax-barrier have little difficulty in manufacturing, and thus the working efficiency can be enhanced.

Finally, the parallax-barrier and a stereoscopic image display apparatus comprising said parallax-barrier control pixels by a vertical/horizontal column unit, not by a cell unit when forming a barrier, and thus the structure of the apparatus is simplified and the cost for manufacture can be reduced.

The invention claimed is:

1. A parallax-barrier module comprising:
    a Liquid-Crystal layer (LC layer) including cells arranged in a cell type matrix structure to form barriers of a horizontal or a vertical direction according to a predetermined control method;
    a controller for controlling said cells of said LC layer in order to form said barriers of the horizontal or the vertical direction, by turning said cells on or off selectively according to said control method;
    a lower layer formed between said LC layer and a predetermined display module in order to dispose said LC layer and said controller at a position off from said display module by a predetermined distance;
    an upper layer formed on the top of said LC layer in order to dispose said LC layer and said controller; and
    a polarizer formed on the top of said upper layer, and visualizing said barriers formed on said LC layer by controlling a polarization angle of light, wherein said light is emitted from said display module and passing through said lower layer, said LC layer and said upper layer,
    wherein said cell type matrix structure includes:
    a first cell row having a first cell whose width*length is a*c and a second cell whose width*length is b*c arranged in alternately repeated manner along the horizontal direction; and
    a second cell row having a third cell whose width*length is a*d and a fourth cell whose width*length is b*d in alternately repeated manner along the horizontal direction,
    wherein said first cell row and said second cell row are arranged in alternately repeated manner along the vertical direction, and
    wherein said arranged fourth cells whose width*length is b*d maintain off,
    wherein said length d of said arranged fourth cells is an interval of said barriers of the horizontal direction, and
    wherein said width b of said arranged fourth cells is an interval of said barriers of the vertical direction.

2. The parallax-barrier module according to claim 1, wherein cell-gaps are formed between said cells.

3. The parallax-barrier module according to claim 1, wherein said controller comprises:
    a first segment terminal (S1), a second segment terminal (S2); and a first common terminal (C1), a second common terminal (C2), wherein said first segment terminal is connected to the odd-numbered cells of said cell column of the vertical direction, and said second segment terminal is connected to the even-numbered cells of said cell column of the vertical direction, wherein said first common terminal is connected to the odd-numbered cells of said cell column of the horizontal direction, and said second common terminal is connected to the even-numbered cells of said cell column of the horizontal direction.

4. The parallax-barrier module according to claim 3, wherein said control method to form said barriers of the horizontal or vertical direction includes:

forming said barriers of the vertical direction by activating said first segment terminal, said first common terminal and said second common terminal; and forming said barriers of the horizontal direction by activating said first segment terminal, said second segment terminal and said first common terminal.

5. The parallax-barrier module according to claim 1, wherein said controller comprises:

a first segment terminal (S1), a second segment terminal (S2); and a first common terminal (C1), a second common terminal (C2), wherein said first segment terminal is connected to the odd-numbered cells of said cell column of the horizontal direction, and said second segment terminal is connected to the even-numbered cells of said cell column of the horizontal direction, wherein said first common terminal is connected to the odd-numbered cells of said cell column of the vertical direction, and said second common terminal is connected to the even-numbered cells of said cell column of the vertical direction.

6. The parallax-barrier module according to claim 5, wherein said control method to form said barriers of horizontal or vertical direction includes:

forming said barriers of the horizontal direction by activating said first segment terminal, said first common terminal and said second common terminal; and forming said barriers of the vertical direction by activating said first segment terminal, said second segment terminal and said first common terminal.

7. The parallax-barrier module according to claim 1, wherein an etching direction of said lower layer in contact with said LC layer is equal to a polarization direction of light emitted from said display module to minimize a reduction of luminance of said light.

8. The parallax-barrier module according to claim 1, wherein an etching direction of said upper layer in contact with said LC layer is rotated direction by 90 degree from an etching direction of said lower layer in contact with said LC layer, such that said barriers are formed or eliminated according to whether said LC layer is driven or not.

9. The parallax-barrier module according to claim 1, wherein said polarizer is located only in front of said upper layer, and wherein a polarization direction of said polarizer is the same as the etching direction of said upper layer.

10. A stereoscopic image display apparatus comprising:

a display module for providing stereoscopic image contents; and a parallax-barrier module being capable of forming barriers of a horizontal or a vertical direction according to a predetermined control method, wherein said parallax-barrier module comprises:

a Liquid-Crystal layer (LC layer) including cells arranged in a cell type matrix structure to form said barriers of the horizontal or the vertical direction according to said control method;

a controller for controlling said cells of said LC layer in order to form said barriers of the horizontal or the vertical direction, by turning said cells on or off selectively according to said control method;

a lower layer formed between said LC layer and said display module in order to dispose said LC layer and said controller at a position off from said display module by a predetermined distance;

an upper layer formed on the top of said LC layer in order to dispose said LC layer and said controller; and a polarizer formed on the top of said upper layer, and visualizing said barriers formed on said LC layer by controlling a polarization angle of light, wherein said light is emitted from said display module and passing through said lower layer, said LC layer and said upper layer, wherein said cell type matrix structure includes:

a first cell row having a first cell whose width*length is a*c and a second cell whose width*length is b*c arranged in alternately repeated manner along the horizontal direction; and a second cell row having a third cell whose width*length is a*d and a fourth cell whose width*length is b*d in alternately repeated manner along said horizontal direction, wherein said first cell row and said second cell row are arranged in alternately repeated manner along the vertical direction, and wherein said arranged fourth cells whose width*length is b*d maintain off, wherein said length d of said arranged fourth cells is an interval of said barriers of the horizontal direction, and wherein said width b of said arranged fourth cells is an interval of said barriers of the vertical direction.

11. The stereoscopic image display apparatus according to claim 10, wherein said display module is one of a flat panel display module, a Thin-Film-Transistor Liquid Crystal Display (TFT-LCD) module, an Organic Light-Emitting Diode (OLED), a Field Emission Display (FED) module and a Plasma Display Panel (PDP) module.

* * * * *